Nov. 8, 1949 — G. LAMBERT — 2,487,344
FISH LURE
Filed Aug. 27, 1947
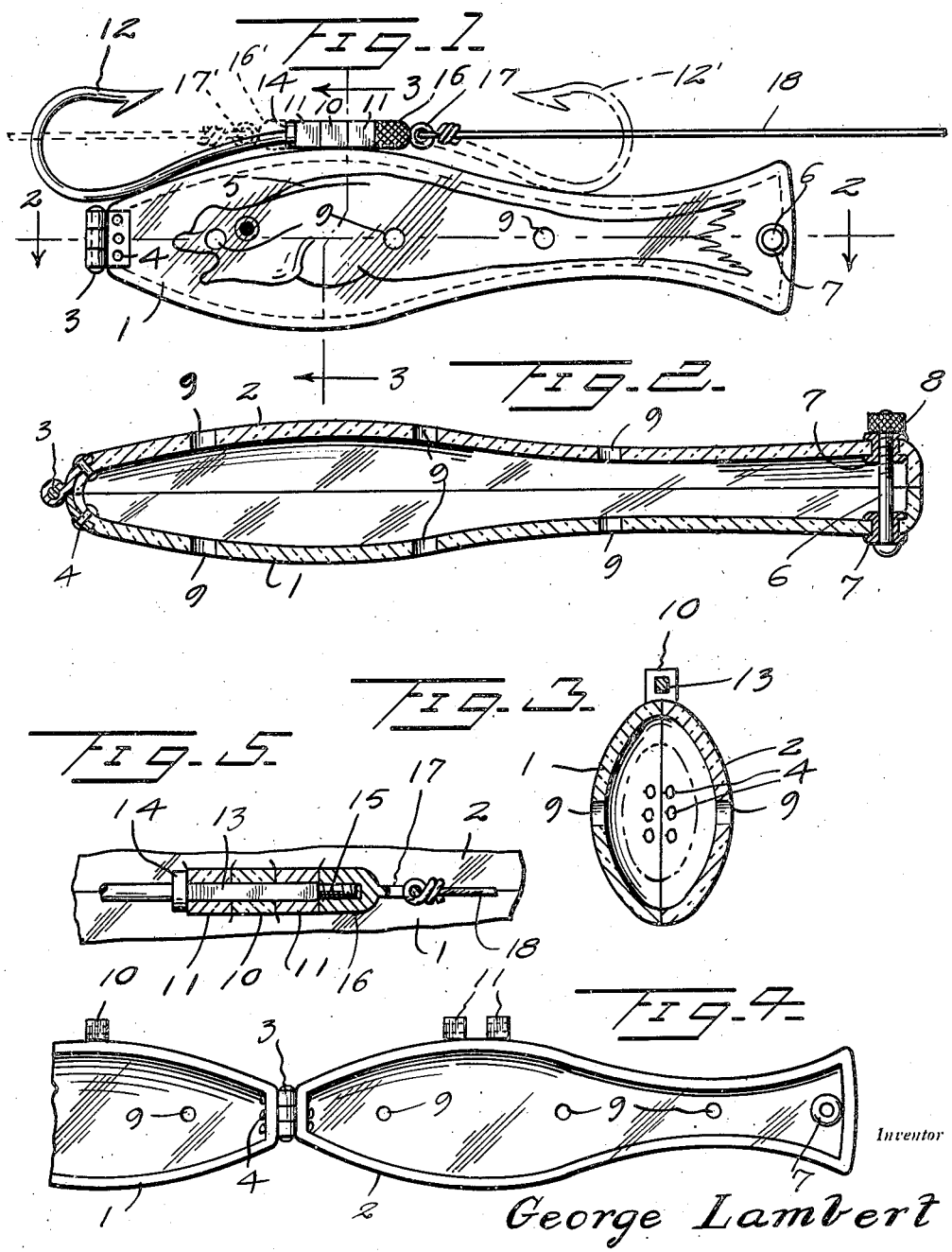
Inventor
George Lambert
By Randolph & Beavers
Attorneys Patented Nov. 8, 1949

2,487,344

UNITED STATES PATENT OFFICE 2,487,344

FISH LURE

George Lambert, Alexandria, La.

Application August 27, 1947, Serial No. 770,834

3 Claims. (Cl. 43—41)

This invention relates to fishing lures and particularly to the type which employs live bait to attract the fish. It has as an object the provision of a lure in which the bait is rendered visible but inaccessible to the fish, so that the bait may be used repeatedly and is not injured by the fish. A further object is to maintain the bait in good condition for an extended period by permitting free access of water to the inside of the lure. A further object is to provide novel means of detachably securing a fish hook to the body section of the lure in fixed relation to the body section. A still further object is to provide for direct attachment of the fishing line to the hook rather than to the body section of the lure, so that the hook is not easily lost when a fish strikes.

An embodiment of this invention is illustrated in the accompanying drawings in which:

Figure 1 is an elevation of the lure containing the bait and shows alternative positions in which the hook may be attached, Figure 2 is a longitudinal cross-section of the lure taken along the line 2—2 of Figure 1, Figure 3 represents a transverse cross-section taken along the line 3—3 of Figure 1, Figure 4 is an elevation of the body section in the opened position, without the hook, and Figure 5 is a plan view showing in detail the means by which the hook is attached to the body section of the lure and to the fishing line.

Referring now to the drawing in more detail, the body section of the lure is composed of two transparent members 1 and 2 which are connected at their front ends by a metal hinge 3 which is attached to the body members by means of rivets 4. The body members are shaped so as to resemble a small fish and, when in closed position, form a receptacle for the live bait 5. The body members are held in the closed position by a bolt 6 which passes through eyelets 7 and is secured in place by a nut 8. A number of holes 9 are spaced along the side of each body member in order to allow water to pass freely through the lure when it is in use. At the top of one body member is a square channelled block 10, and at the top of the other member are two such blocks 11, adapted to interleave with the block 10 when the body section is in the closed position (as shown in Figure 5), and to form with it an elongated passage of square cross section. The blocks 10 and 11 may be secured in any suitable manner to the members 1 and 2, respectively. The hook 12 has a portion 13 of its shank which is also of square cross section and which may be inserted into the passage formed by the channelled blocks 10 and 11. When so inserted, the fish hook is held in fixed relation to the body section of the lure and is prevented from turning independently. A flange 14 on the shank of the hook prevents the shank from being inserted too far into the passage. The shank end 15 of the hook is threaded to permit screwing on of a cap nut 16 which holds the hook securely in place. The cap nut has an eye 17 to which is tied the fishing line 18.

The hook 12 may be inserted into the channelled blocks 10 and 11 in either direction, and this is indicated in Figure 1. In the position shown by solid lines, the hook is inserted from the forward end of the lure and the fishing line extends to the rear of the lure, so that when the line is pulled, the bait will move backwards in the water. If it is desired to have the bait move forwards in the water when the line is pulled, the hook may be inserted from the tail end of the lure, and will occupy the position shown by the dotted lines. In Figure 1, the hook in this position is represented by 12', the cap nut and eye by 16' and 17' respectively and the fishing line by 18'.

The transparent body members of the lure are preferably made of a suitable plastic such as a methacrylate polymer, while the hinge, eyelets, bolt, channelled blocks and cap nut may be made of any desired non-rusting or rust resistant metal.

Preparation of the lure for use is simply and rapidly performed by opening the body section to the position shown in Figure 5, inserting a live minnow or shiner of a size slightly smaller than the lure, closing and bolting the body section, inserting the shank of the hook through the channelled blocks and screwing on the cap nut with the line attached. The lure is then in condition for use and may be employed to repeatedly catch fish without impairing the vitality of the bait.

It will be apparent that the use of this lure will entail a considerable saving in bait, while achieving all the advantages of using live bait. As the hook is rigidly secured to the body section of the lure, there is relatively little danger of losing the bait as so frequently occurs in live bait fishing. The fact that the hook is fixed in a position with relation to the bait, from which position it cannot be displaced, makes it possible to hook securely a high proportion of the fish which strike at the lure.

Another advantage which this lure possesses over other lures of this general type lies in the fact that the fishing line is attached directly through the cap nut to the hook rather than to the plastic body section of the lure, so that the strain which results when a fish strikes at the lure is borne by the hook and not by the weaker plastic frame.

This lure may be made in various sizes to accommodate whatever size bait is to be used, and may be used on bait as large as the mullets frequently employed in deep-sea fishing.

Although the invention has been described particularly in terms of a specific embodiment thereof, it is apparent that numerous minor variations may be made without departure from the spirit of the invention, the scope of which is intended to be limited only as defined in the following claims.

I claim:

1. A hollow fish shaped lure adapted to hold live bait comprising transparent hinged longitudinally separable body members, square channelled blocks attached to the upper edges of said body members, a hook, the shank of which has a square cross sectioned portion adapted to engage said blocks and to hold the hook in fixed relation to the body members, means for detachably securing the hook in position, and a fishing line attached to said securing means.

2. A live bait fishing lure comprising a hook, the shank of which has a threaded end, a square cross sectioned portion adjacent to the threaded end and a flange adjacent to the square cross sectioned portion, transparent hinged, fish shaped longitudinally separable body members, square channelled blocks attached to the upper edges of said body members and adapted to receive the square cross sectioned portion of the hook, and a cap nut for engaging the threaded shank end of the hook, said cap nut having an eye to which a fishing line may be fastened.

3. A hollow fishing lure adapted to hold live bait comprising longitudinally separable transparent body members hinged to one another at their front ends; interfitting square channelled blocks attached to the upper edges of the body members, a hook, the shank of which has a threaded end, a square cross sectioned portion, and a flange, which adjoin each other, said cross sectioned portion being adapted to engage said channelled blocks and thereby to hold the hook in fixed position relative to the body members, and an eyed cap nut adapted to engage the threaded shank end of the hook and thereby to secure the hook to the body members, the eye of said cap nut serving as a means for attaching a fishing line to the hook.

GEORGE LAMBERT.

REFERENCES CITED

The following references are of record in the file of this patent:

UNITED STATES PATENTS

| Number | Name | Date |
| --- | --- | --- |
| 573,572 | Dales | Dec. 22, 1896 |
| 1,264,658 | King | Apr. 30, 1918 |
| 1,334,839 | Cole | Mar. 23, 1920 |
| 2,255,793 | Kridler | Sept. 16, 1941 |

FOREIGN PATENTS

| Number | Country | Date |
| --- | --- | --- |
| 552,126 | France | Apr. 24, 1923 |